Patented Nov. 6, 1934

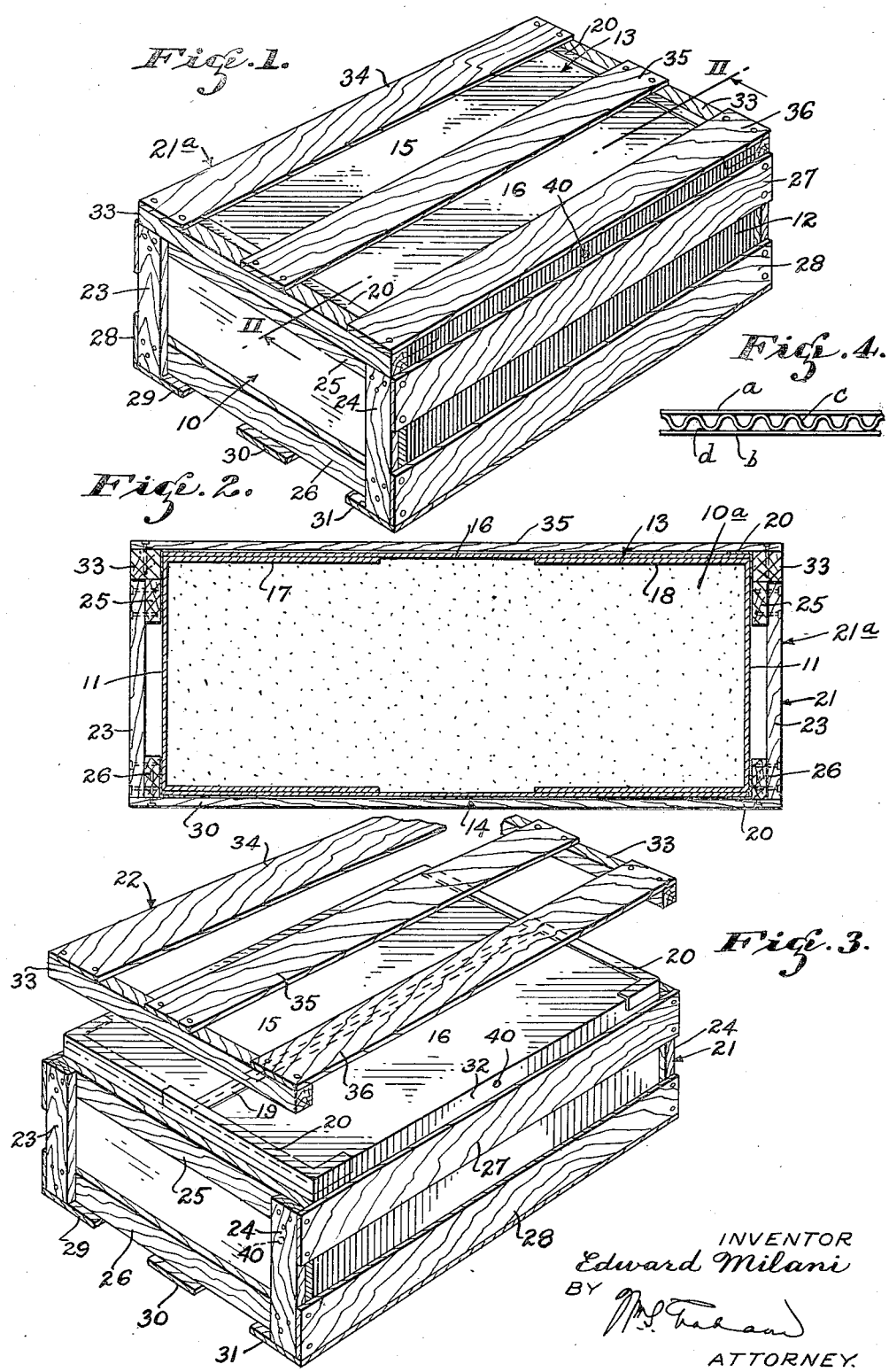

1,979,759

UNITED STATES PATENT OFFICE 1,979,759

SHIPPING RECEPTACLE

Edward Milani, San Francisco, Calif.

Application January 31, 1933, Serial No. 654,437

3 Claims. (Cl. 217—3)

This invention relates to a receptacle and more particularly but not necessarily to a shipping receptacle for perishable organic products, such as fruits, flowers, vegetables and delicate products, such as eggs.

It is one object of this invention to provide a novel receptacle for shipping perishable organic products that shall delay the decay thereof.

Another object is to provide a receptacle for shipping perishable organic products which has the combined characteristics of strength, cheapness, padding effect, a reasonable degree of impenetrability by exterior moisture, which provides resistance to evaporation of the juices and moisture in the packed product by exterior heat or dryness, and which is self-protective against dismemberment of its walls from absorption of moisture.

Another object is to provide a novel receptacle for shipping organic products having novel means for discharge from the receptacle of excess gases ordinarily given off by such products as they pass toward a state or condition of complete maturity.

Another object is to provide an improved crate receptacle for shipping products that shall protect such products during transportation or shipment and prevent the spoiling of the products by bruising and thereby avoid rapid decaying of the contained products, and which will act as thermal insulation against sudden or extreme changes of temperature.

Another object is to provide a novel receptacle for shipping products that will preserve such products such as above mentioned, to the extent of delaying development thereof to an optimum, or full maturity for a period greater than that required to mature the commodity should the same be allowed to mature on its parent plant or exposed to the atmosphere in an unprotected condition.

A further object is to provide a shipping receptacle of novel construction wherein products such as above mentioned, may be packed for shipment in such a manner that the gases generated by ripening thereof, may flow from the receptacle and sufficient atmospheric air may be allowed in the receptacle to support the life of the product.

A still further object is to provide in a receptacle having insulating properties, and a supporting outer frame, novel means for sealing the edges of the receptacle sufficiently to prevent the entrance of excess atmospheric air.

The above and other objects will be made apparent throughout the further description of the invention when taken in connection with the accompanying drawing, wherein like reference characters refer to like parts. It is to be distinctly understood that the drawing is not a definition of the invention but is merely one form of a receptacle that will carry out the invention, the definition of the invention being defined by the appended claims.

In the drawing:

Fig. 1 is a perspective view of a receptacle embodying the invention.

Fig. 2 is a sectional view taken along the line II—II of Fig. 1.

Fig. 3 is a similar view to Fig. 1, having the cover lifted in order to disclose certain features of the invention.

Fig. 4 is a fragmentary side edge view of the material of the receptacle walls.

In the form shown, the present invention is particularly, but not necessarily designed to make use of fragile and cheaper material in the manufacture of receptacles such as corrugated paper or board, which material may be coated on its inner side, or at least one or both of its sides with a moisture resistant substance such as paraffin in order to render the receptacle practically impervious to penetration by moisture, either from the exterior or the interior. Heretofore it has been necessary to employ such material as metal, wood, or substances which are considerably more expensive than cardboard for manufacturing impervious receptacles, the latter being adapted to stamping an entire container in flat sheet form and requiring no further manipulation except folding on creased lines, eliminating the waste of expensive space for transportation and storage when in sheet form. The corrugations of the container body also serve as thermal insulation and as a pad between the perishable packed product and the outer frame structure.

The present invention introduces a receptacle made from corrugated paper or board that may readily be treated to render it impervious to moisture, together with a novel supporting structure for re-enforcing the main body of the receptacle and preventing any damage to the receptacle during shipment or transporting thereof. Also, the novel supporting structure is so constructed as to receive the fragile body of the receptacle and prevent any bulging or otherwise distorting of the sides of the receptacle during the packing of articles therein. Further, the improved supporting structure is adapted to receive the fragile or corrugated body in such a manner that the upper edges of the fragile body terminate above the upper edges of the lower frame structure and provide ready access for the sealing of the co-operating upper edges of the container body.

A novel cover for the lower frame structure is provided for, completing the frame structure and is adapted to seat on to the lower frame structure and in close relation to the remaining unprotected portions of the fragile body.

In the drawing the fragile container body or corrugated portion of the receptacle is represented in its entirety by 10 and is preferably formed of sheet material comprising parallel faces *a* and *b* and a corrugated filler *c* therebetween, commonly known as double-faced corrugated board, the filler and face sheets being suitably connected at *d*, as by glue, to provide a composite sheet. The waterproofing, generally indicated by stippling 10*a*, in addition to preventing the evaporation of the juices in the product and resisting penetration by exterior moisture, also serves to prevent relative dismemberment of the faces and filler which are usually connected by glue, and further insures that if the exterior of the container became wet, the adhesive in the body wall would not soak through the wall and be absorbed into the product which abuts the inner face of the wall. In case it is deemed desirable to waterproof the exterior of the container, this should be accomplished in such a way as not to produce non-adherent surfaces when the tape 19 is to be adhered, and may be accomplished by a very thin coat of shellac to which the tape will adhere, or if preferred, the container may be packed before placing in the outer frame 21, the sealing tape affixed, and the container then immersed in a waterproof substance such as heated paraffin so that the entire exterior, including the tape, will be waterproofed, and the insulating container walls will prevent any damage from heat to the packed product, and the paraffin will also act as a lubricant so that the packed container will slide easily into the supporting structure of frame 21.

The body of the receptacle may be of any desired shape such as rectangular in cross section and is preferably constructed in the conventional manner having end portions 11, side portions 12 and top and bottom portions represented in their entirety by 13 and 14 respectively. The top and bottom portions 13 and 14 may be similarly constructed, each of which may comprise folding side flaps 15 and 16 and end flap portions 17 and 18. The flaps 15 and 16 have their outer edges integral with their respective sides 12 and the flap portions 17 and 18 have their outer edges integral with their respective end portions 11. It can be seen therefore, that when the flaps are folded to their closed position forming the top or bottom, that the adjacent edges of the side flaps 15 and 16 are adapted to lie in close proximity one to the other. However, this is not sufficient to hermetically seal the receptacle and a suitable sealing element such as frangible tape 19 is provided to seal the crevice as clearly shown by the drawing; also, while the co-operating side and end flaps are disposed in superimposed position, they do not form a sufficient seal therebetween to prevent the entrance freely of atmospheric air. Therefore, a suitable sealing element such as frangible tape 20 is provided around the upper and lower edges of the end of the corrugated body whereby the crevices at the bottom and top may be hermetically sealed or at least sufficiently sealed to prevent the free entrance of excess atmospheric air for all purposes of the present invention.

The improved supporting structure or frame, generally indicated 21*a*, comprises a main lower portion represented in its entirety by 21 and an upper portion or cover represented in its entirety by 22. The lower or main portion 21 comprises spaced vertical end members 23 and 24 and spaced horizontal end members 25 and 26. The members 23 to 26 inclusive, form the ends of the lower portion and it will here be noticed that the upper edge and ends of the horizontal members 25 and 27 respectively, terminate in spaced relation and below the upper edge of the co-operating ends 11 of the container body 10. The sides of the lower portion 21 comprise a pair of spaced horizontal members 27 and 28 and the bottom of the portion 21 comprises spaced horizontal members disposed in a plane at right angle to the side members 27 and 28 and end members 25 and 26. These bottom members 29, 30, and 31 as well as the side members 27 and 28 have their co-operating ends fixed to the co-operating vertical end members 23 and 24 by any suitable means such as screws, nails, or the like. The upper edges of the side members 27 terminate in spaced relation and below the co-operating upper edges of the sides 12 of the body 13 in the same manner as do the end members 25. It can be clearly seen from Fig. 3 that the lower portion 21 of the supporting structure receives the body 14 in such a manner as to provide sufficient space 32 between the upper edges of the body 13 and the upper edges of the lower frame structure 21 to render ready access to the upper edges of the body 13 for attaching the sealing strips 20.

The upper portion of the supporting structure or cover 22 comprises horizontal end members or flanges 33 depending from horizontal top members 34, 35 and 36. The end members or flanges 33 are of substantially the same height as the height of the portion or space 32 of the body 10, and are adapted to seat upon the upper ends and edges of the co-operating end members 23 and 25 respectively. The top members 34, 35 and 36 are adapted to lie in superimposed position on the top 13 of the body 10. The cover 22 is fixed to the lower portion 21 of the frame structure in any suitable manner, such as by nailing the co-operating end members 33 and 25 in fixed ridged relation.

Another very important feature of the invention is the provision and placing of a small opening 40 in the body 10 adjacent the upper edge of one or more of the ends 11 of the body 10 and in protected relation with one of the vertical members 23, the latter being in spaced relation with the adjacent portions of the body, or the upper edge of one or more of the sides 12. This opening is of sufficient diameter to provide for the escape or flow from the receptacle of excess gases generated therein by the ripening or maturing of the contained articles.

It is to be understood that the size of the opening 40 may vary slightly when used in connection with different products and with containers of varying cubical content; also, it is to be understood that one or more openings 40 may be employed to effectuate the purpose and intent of the invention.

It is to be also noted that the placing of the opening 40 adjacent the upper edge of the side 12, or end 11 of the body 10 is a very important feature, as by placing the opening 40 in either of these particular positions or places it is protected by the adjacent members of the supporting structure from becoming damaged or closed during transportation and is assured of efficient operation at all times.

In carrying out the present invention, the edges 14 of the bottom of the container body 10 are properly sealed and before the container body is placed in the lower supporting structure 21. The receptacle is preferably then placed within the lower supporting structure and then packed with the selected article, the lower portion 21 of this supporting structure operating to prevent bulging or otherwise distorting the sides and ends of the body during the packing of the receptacle. When the receptacle is full, the end flaps 17 and 18 and side flaps 15 and 16 are folded to form the top 13 as above described. Thereafter, the adjacent inner edges of the flaps 15 and 16 are sealed as indicated at 19 and the end edges are sealed as shown at 20 during which time the portion 32 of the body presenting ready access for the sealing after which time the upper or cover portion 22 of the frame structure is placed in proper position and fixed to the lower portion 21 completing the receptacle ready for shipment.

While I have described and illustrated but one embodiment of this invention it will be apparent to those skilled in the art that certain changes, substitutions, modifications, additions and omissions may be made in the single form of receptacle illustrated in the drawing without departing from the spirit and scope of the invention as defined by the appended claims.

I claim:

1. A receptacle for shipping fresh perishable products comprising a rectangular box body composed of double faced corrugated board having at least one of its faces treated to render it resistant to penetration by moisture, said box body having its top formed of flaps which are a continuation of the side walls of the box angularly bent at the upper edge of the box body, said flap portions being adapted for relatively cooperating to substantially completely over-lie the interior of the box and to close the box except for crevices at two ends and transversely of the top, a crate having a rectangular interior for receiving therein said box body, said crate comprising top and bottom sections, said bottom section being adapted to receive the greater portion of the vertical height of said box body, the upper edges of said bottom section terminating in spaced relation and adjacently below the upper edges of said box body so that the crevices at the top of the box are free of said bottom section when the box body is placed within the bottom section, the said top section of the crate including longitudinal slats and depending flanges, the latter being adapted for seating on the upper edge of the said bottom section at the ends of the enclosed box body, the height of said flanges being substantially equal to the height of the enclosed box body which is above and free of said bottom section.

2. A receptacle in accordance with claim 1 wherein the enclosed box body is sealed at the crevices and is provided with a vent therein of such size relative to the cubical volume of the said container that gases progressively accumulating from the further maturity of the packed product may be confined in the container against free unrestricted flow therefrom but may flow from said container responsive to the pressure of accumulation of said gases in the container.

3. A receptacle for shipping fresh perishable products comprising a rectangular box body composed of spaced faces having air spaces therebetween, said box body having its top formed of flaps which are a continuation of the side walls of the box angularly bent inwardly at the upper edge of the box body, said flap portions being adapted for relatively cooperating to substantially completely over-lie the interior of the box and to close the box except for crevices at two ends and transversely of the top, a supporting structure having a rectangular interior for receiving therein said box body, said structure comprising bottom and top sections, said bottom section being adapted to receive the greater portion of said box body, the upper edges of said bottom section terminating in spaced relation adjacently below the upper edges of said box body so that the crevices at the top of the box are free of said bottom section when the box body is within the said bottom section, the said top section including a top portion and depending flanges, the latter being adapted for seating on the upper edge of the said bottom section at the ends of the enclosed box body, the height of said flanges being substantially equal to the height of the enclosed box body which is above and free of said bottom section, and the width of said flanges being substantially equal to the greatest thickness of the walls at the upper edges upon which the flanges seat.

EDWARD MILANI.